(12) United States Patent
Kang et al.

(10) Patent No.: US 8,110,255 B2
(45) Date of Patent: Feb. 7, 2012

(54) METHOD FOR PREPARATION OF HYBRID COMPRISING MAGNETITE NANOPARTICLES AND CARBON NITRIDE NANOTUBES

(75) Inventors: Jeung-Ku Kang, Daejeon (KR); Jung-Woo Lee, Daejeon (KR); Ravindranath Viswan, Daejeon (KR); Yoon-Jung Choi, Daejeon (KR); Yeob Lee, Daejeon (KR); Se-Yun Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 175 days.

(21) Appl. No.: 12/764,467

(22) Filed: Apr. 21, 2010

(65) Prior Publication Data
US 2010/0310789 A1    Dec. 9, 2010

(30) Foreign Application Priority Data
Jun. 5, 2009    (KR) .................. 10-2009-0050087

(51) Int. Cl.
*B05D 3/00*    (2006.01)
*H05H 1/24*    (2006.01)
(52) U.S. Cl. ......... 427/577; 427/191; 427/215; 427/217
(58) Field of Classification Search .................. 427/577, 427/191, 215, 217
See application file for complete search history.

(56) References Cited

U.S. PATENT DOCUMENTS
6,231,980 B1 *    5/2001   Cohen et al. .................. 428/402
2010/0055459 A1 *   3/2010   Desimone et al. ............ 428/402

OTHER PUBLICATIONS

Lee Jung Woo, et al., "Facile Fabrication and Superparamagnetism of Silica-Shielded Magnetite Nanoparticles on Carbon Nitride Nanotubes". Adv. Funct. Mater. 2009, 19, 2213-2218.*
Maity, Dipak, et al., Studies of magnetite nanoparticles synthesized by thermal decomposition of iron (III) acetylacetonate in tri(etheylene glycol). Journal of Magnetism and Magnetic Materials, 321, (2009) 3093-3098.*

* cited by examiner

*Primary Examiner* — Bret Chen
(74) *Attorney, Agent, or Firm* — Baker & Hostetler LLP

(57) ABSTRACT

The present invention discloses a method for preparation of a hybrid comprising magnetite nanoparticles and carbon nitride nanotubes, comprising: preparing carbon nitride nanotubes by plasma chemical vapor deposition (CVD); dissolving the prepared carbon nitride nanotubes in triethyleneglycol to form solution and adding Fe (acetylacetonate)$_3$ to the solution to obtain a mixture; and heating and cooling the mixture to form a hybrid comprising magnetite nanoparticles and carbon nitride nanotubes, in which the carbon nitride nanotubes are doped with magnetite nanoparticles.

8 Claims, 7 Drawing Sheets

METHOD FOR PREPARATION OF HYBRID COMPRISING MAGNETITE NANOPARTICLES AND CARBON NITRIDE NANOTUBES

CROSS-REFERENCE TO RELATED APPLICATIONS

This application claims priority to foreign Patent Application KR 10-2009-0050087, filed on Jun. 5, 2009, the disclosure of which is incorporated herein by reference in its entirety.

FIELD OF THE INVENTION

The present invention relates to a method for preparation of a hybrid comprising magnetite nanoparticles and carbon nitride nanotubes, by doping magnetite nanoparticles having homogeneous particle size on the surface of carbon nitride nanotubes

BACKGROUND OF THE INVENTION

Compared to bulk materials, a nanoparticle material worthy of notice now has electric, optic and/or magnetic properties, thus being subjected to numerous researches and investigations in a variety of applications. Owing to readily controllable chemical activities and large specific surface area, the nanoparticle material has been often used as a carrier for metal or semiconductor nanoparticles. Accordingly, a hybrid of nanoparticles and carbon nanotubes having synergistic effects thereof draws attention for a wide range of applications such as catalyst, sensor, hydrogen storage, nano-electronics, etc.

However, in spite of the foregoing advantages, it is difficult to homogeneously distribute nanoparticles with uniform particle size on carbon nanotubes without pretreatment of the carbon nanotubes. For instance, most of oxidation processes using strong acids may cause significant damage to a pure carbon nanotube wall while generating oxidation functional groups such as carboxylic acid. Covalent bond functionalization changes carbon-carbon bonds, more particularly, converts sp2-sp2 orbital into sp2-sp3 orbital. This may result in degradation in original and favorable properties of carbon nanotubes.

Carbon nitride nanotubes are carbon nanotubes substituted with nitrogen atoms. Nitrogen serves as a site for nucleation during adsorption of nanoparticles, which is advantageous in preparation of a hybrid. Accordingly, the aforementioned material has been proposed as an alternative solution to overcome the foregoing problems. For example, a research result for adsorption of silver nanoparticles on carbon nitride nanotubes was reported, wherein an adsorption of silver particles increases during reduction of metal salts without acid treatment for achieving functionalization. However, this method entailed a problem in that magnetic nanoparticles are liable to alteration of chemical stability since the nanoparticles are exposed to air or a solution.

SUMMARY OF THE INVENTION

The present invention solves conventional problems as described above, and one aspect of the present invention provides a method for preparation of a hybrid comprising magnetite nanoparticles and carbon nitride nanotubes by doping the surface of the carbon nitride nanotubes with nanoparticles having uniform particle size.

Another aspect of the present invention provides a method for preparation of a hybrid comprising magnetite nanoparticles and carbon nitride nanotubes with improved chemical stability.

Embodiments of the present invention provide a method for preparation of a hybrid comprising magnetite nanoparticles and carbon nitride nanotubes, comprising: preparing carbon nitride nanotubes by plasma chemical vapor deposition (CVD); dissolving the prepared carbon nitride nanotubes in triethyleneglycol to form solution and adding Fe (acetylacetonate)$_3$ to the solution so as to obtain a mixture; and heating and cooling the mixture to form the hybrid comprising magnetite nanoparticles and carbon nitride nanotubes, in which the carbon nitride nanotubes are doped with magnetite nanoparticles.

The inventive preparation method of the hybrid comprising magnetite nanoparticles and carbon nitride nanotubes may further comprise a process of coating the hybrid with silica after the formation of the hybrid.

According to one method for preparation of a hybrid comprising magnetite nanoparticles and carbon nitride nanotubes, the hybrid may comprise magnetite nanoparticles homogeneously doped on the surface of carbon nitride nanotubes while maintaining superparamagnetic properties of the magnetite nanoparticles.

In addition, the hybrid comprising magnetite nanoparticles and carbon nitride nanotubes according to the present invention may have improved chemical stability by coating the hybrid of nanotubes with silica.

BRIEF DESCRIPTION OF THE DRAWINGS

The above and other aspects, features and advantages of the present invention will be more clearly understood from the following detailed description taken in conjunction with the accompanying drawings, in which:

FIG. 9A is a photograph showing dispersion of a hybrid comprising magnetite nanoparticles and carbon nitride nanotubes in water while

FIG. 12A is a STEM photograph showing the silica-coated hybrid comprising magnetite nanoparticles and carbon nitride nanotubes while

DETAILED DESCRIPTION

Figure 1:
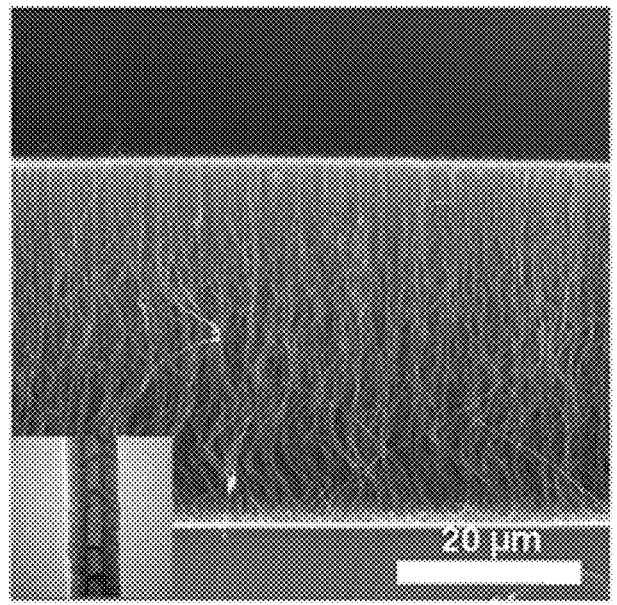
FIG. 1 is a SEM photograph and an enlarged TEM photograph showing the carbon nitride nanotube in as-grown state according to Preparative Example 1 of the present invention.

According to one embodiment of the present invention, a method for preparation of a hybrid comprising magnetite nanoparticles and carbon nitride nanotubes comprises preparing carbon nitride nanotubes by plasma chemical vapor deposition (CVD); dissolving the prepared carbon nitride nanotubes in triethyleneglycol to form solution and adding Fe (acetylacetonate)$_3$ to the solution so as to obtain a mixture; and heating and cooling the mixture to form the hybrid comprising magnetite nanoparticles and carbon nitride nanotubes, in which carbon nitride nanotubes are doped with magnetite nanoparticles.

The inventive method for preparation of the hybrid comprising magnetite nanoparticles and carbon nitride nanotubes may further comprise coating of the hybrid with silica after formation of the hybrid comprising magnetite nanoparticles and carbon nitride nanotubes (hereinafter, also abbr. as hybrid).

The CVD process is preferably performed with a plasma power of 350 to 1,500 W at 500 to 850° C. under a pressure of 10 to 30 Torr.

Preferably, the CVD process uses plasma containing methane and nitrogen gases in a ratio by volume of 1:99 to 99:1.

The mixture used herein may comprise a mixture of carbon nitride nanotubes and Fe (acetylacetonate)$_3$ in a ratio by weight of 1~10:20~800.

The heating is preferably carried out at 100 to 300° C.

The carbon nitride nanotube may contain nitrogen with a graphite-like or pyridine-like structure substituted at the surface of the carbon nitride nanotube.

The coating process is preferably performed using a mixture of tetraethyl orthosilicate (TEOS) and NH$_4$OH.

Hereinafter, the present invention will be described in greater detail with reference to the following preparative examples, experimental examples and comparative examples. However, these examples are intended for illustrative purposes and it would be appreciated by a person skilled in the art that various modifications and variations may be made without departing from the scope of the present invention. Therefore, it is not construed that the present invention is restricted to such examples.

EXAMPLES

Preparative Example 1

Hybrid Comprising Magnetite Nanoparticles and Carbon Nitride Nanotubes

In order to produce a hybrid comprising magnetite nanoparticles and carbon nitride nanotubes of the present invention, a carbon nitride nanotube was firstly prepared.

Fe catalyst was deposited on a SiOx/Si substrate by RF sputtering with a RF power of 100 W at 200° C. under a pressure of 15 mTorr in an Ar gas atmosphere of 20 sccm, leading to the SiOx/Si substrate with Fe deposition with a thickness of 7 nm.

Moving the Fe-deposited SiOx/Si substrate to a plasma deposition apparatus, the substrate was subjected to a pretreatment with a microwave power of 700 W at 550° C. under 18 Torr in a nitrogen gas stream at a flow rate of 85 sccm for 1 minute. Then, the substrate was placed in a methane gas stream at a flow rate of 15 sccm for 20 minutes in specified conditions such as a pressure of 21 Torr, a temperature of 700° C. and a microwave power of 700 W. As a result, carbon nitride nanotubes grown on the Fe-deposited substrate were obtained.

FIG. 1 is a SEM photograph and an enlarged TEM photograph showing the carbon nitride nanotube in as-grown state. From the SEM photograph in FIG. 1, it could be found that the carbon nitride nanotube has nodes therein. Also the TEM photograph showed that Fe portion was vertically grown in the Fe-deposited substrate with a length of about 40 μm.

Next, after dissolving 5 mg of the carbon nitride nanotube in triethyleneglycol, 100 mg of Fe (acetylacetonate)$_3$ was added, followed by elevating the temperature up to 275° C. by 5° C./minute under refluxing and maintaining the same temperature for 30 minutes. Then, after cooling to room temperature and centrifuging at 6000 rpm for 50 minutes, the treated nanotube was washed and dried at 60° C. for 8 hours. Consequently, a hybrid comprising magnetite nanoparticles and carbon nitride nanotubes was obtained, which was doped with magnetite (Fe$_3$O$_4$) nanoparticles.

Figure 2:
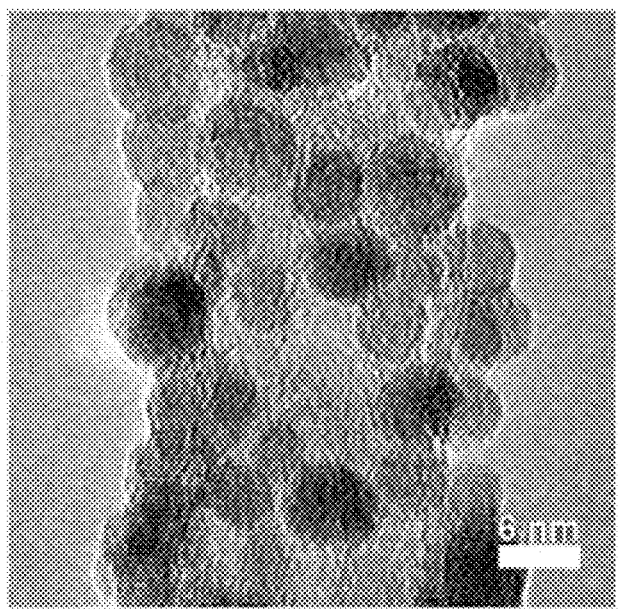
FIG. 2 is a TEM photograph showing a hybrid comprising magnetite nanoparticles and carbon nitride nanotubes according to Preparative Example 1 of the present invention.

FIG. 2 is a TEM photograph showing a hybrid comprising magnetite nanoparticles and carbon nitride nanotubes. As shown in FIG. 2, it was demonstrated that magnetite nanoparticles with a constant size of about 6 nm were dispersed with a density of 0.0285 particles/nm$^2$ on the surface of the carbon nitride nanotubes.

Preparative Example 2

Silica-Coated Hybrid Comprising Magnetite Nanoparticles and Carbon Nitride Nanotubes In order to improve chemical stability of the hybrid comprising magnetite nanoparticles and carbon nitride nanotubes of the present invention, silica coating was performed on the basis of the Stober process.

First, the hybrid comprising magnetite nanoparticles and carbon nitride nanotubes prepared in Preparative Example 1 was dispersed in a mixture solution of 10 mL distilled water and 10 mL ethanol. To the dispersion containing the prepared hybrid, 0.5 mL TEOS and 0.3 mL NH$_4$OH were added. The solution was stirred for 30 minutes and centrifuged for 15 minutes, leading to a hybrid coated with silica comprising magnetite nanoparticles and carbon nitride nanotubes.

Figure 3:
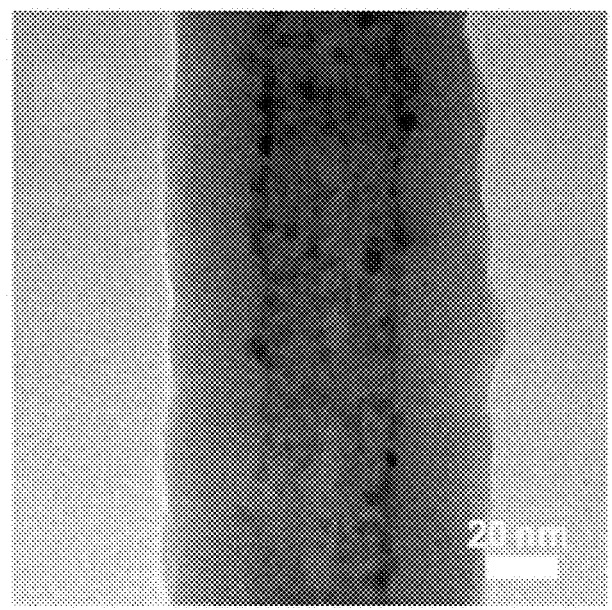
FIG. 3 is a TEM photograph showing a silica-coated hybrid comprising magnetite nanoparticles and carbon nitride nanotubes according to Preparative Example 2 of the present invention.

FIG. 3 is a TEM photograph showing the silica-coated hybrid comprising magnetite nanoparticles and carbon nitride nanotubes. From FIG. 3, it could be found that a silica coating with a thickness of 20 to 30 nm is formed around the hybrid comprising magnetite nanoparticles and carbon nitride nanotubes.

Experimental Example 1

XRD Analysis of Hybrid Comprising Magnetite Nanoparticles and Carbon Nitride Nanotubes In order to investigate major ingredients of the hybrid comprising magnetite nanoparticles and carbon nitride nanotubes prepared in Preparative Example 1, an XRD analysis was performed. For comparison, conventional carbon nitride nanotubes and conventional magnetite nanoparticles were also subjected to the XRD analysis and results thereof are shown in FIG. 4.

Figure 4:
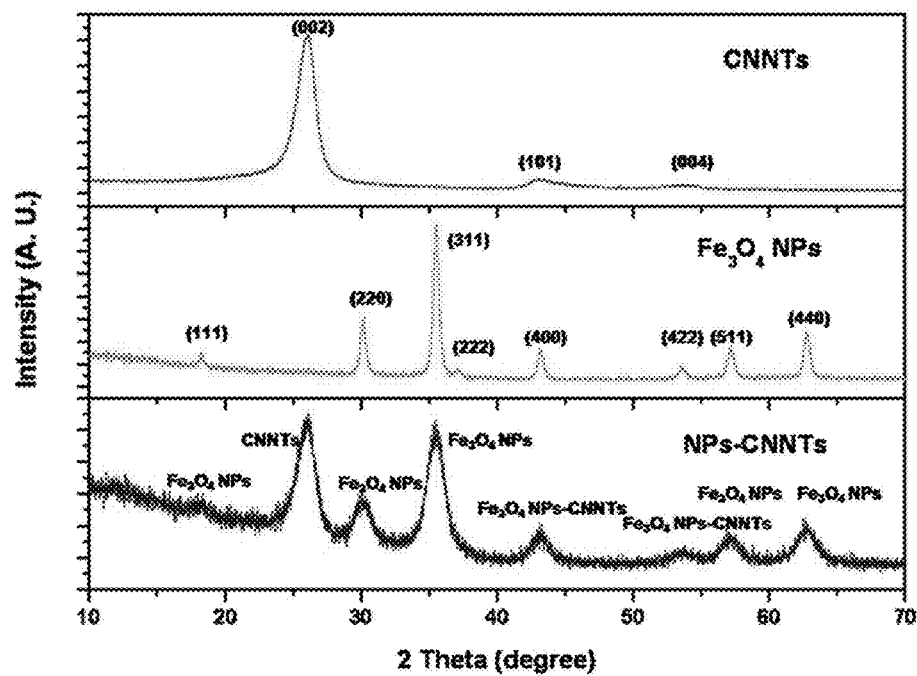
FIG. 4 is a graph showing results of X-ray diffraction (XRD) analysis of conventional magnetite nanoparticles, conventional carbon nitride nanotubes and the hybrid comprising magnetite nanoparticles and carbon nitride nanotubes prepared in Preparative Example 1 of the present invention.

An upper portion of FIG. 4 shows the result of XRD analysis in relation to carbon nitride nanotubes (CNNTs) commonly available in the art, wherein three specific peaks for CNNTs are exhibited at 25.99° (002), 42.94° (101) and 53.62° (004).

A middle portion of FIG. 4 shows the result of XRD analysis in relation to magnetite nanoparticles, $Fe_3O_4$ NPs, commonly available in the art, wherein eight specific peaks for $Fe_3O_4$ NPs are exhibited at 18.28° (111), 30.17° (220), 35.5° (311), 37.13° (222), 43.15° (400), 53.57° (422), 57.2° (511) and 62.8° (440).

Lastly, a lower portion of FIG. 4 shows the result of XRD analysis in relation to the hybrid comprising magnetite nanoparticles and carbon nitride nanotubes of the present invention, wherein all of three peaks specific to the carbon nitride nanotubes and eight peaks specific to the magnetite nanoparticles are exhibited. Such results demonstrate that the final product obtained from Preparative Example 1 is a hybrid comprising carbon nitride nanotubes adsorbed with magnetite nanoparticles.

In addition, the magnetite nanoparticles formed by the Scherrer method had an average size of about 6.2 nm substantially equal to the result shown in the TEM photograph of FIG. 2.

Experimental Example 2

Figure 5:
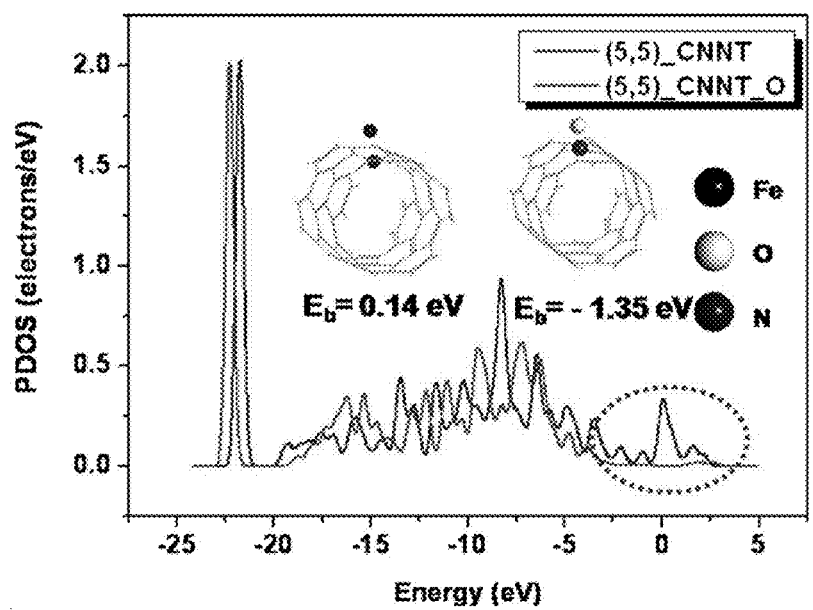
FIG. 5 is a graph showing results of partial density of states (PDOS) analysis and binding energy in relation to nitrogen substituted (5,5) chiral carbon nitride nanotubes.

PDOS Analysis and Binding Energy of Hybrid Comprising Magnetite Nanoparticles and Carbon Nitride Nanotubes For the hybrid comprising magnetite nanoparticles and carbon nitride nanotubes prepared in Preparative Example 1, an PDOS analysis was performed to investigate a reaction of carbon nitride nanotubes with Fe acetylacetonate and its result is shown in FIG. 5.

Comparing a graph for nitrogen substituted (5,5) chiral carbon nitride nanotubes ((5,5)_CNNT) to a graph for nitrogen substituted (5,5) chiral carbon nitride nanotubes adsorbed with oxygen atoms ((5,5)_CNNT_O), it could be found that a peak near the Fermi energy level has disappeared in the graph of (5,5)_CNNT_O. It means that electrons present near the Fermi energy level have transferred to a bonding orbital inside an atom.

As a result of analyzing the binding energy Eb indicated in FIG. 5, it can be seen that Fe adsorbed (5,5)_CNNT has Eb of 0.14 eV while (5,5)_CNNT_O has Eb of −1.35 eV. Such results demonstrate that oxygen atoms are adsorbed during an initial nucleation rather than Fe atoms, with respect to a reaction between carbon nitride nanotubes and Fe acetylacetonate.

Experimental Example 3

PDOS Analysis and Binding Energy of Hybrid Comprising Magnetite Nanoparticles and Carbon Nitride Nanotubes The same procedure as described in Experimental Example 2 was repeated except that nitrogen substituted (8,0) chiral carbon nitride nanotubes were used in place of (5,5)_CNNT. PDOS analysis results are shown in FIG. 6.

Comparing a graph for nitrogen substituted (8,0) chiral carbon nitride nanotubes ((8,0)_CNNT) to a graph for nitrogen substituted (8,0) chiral carbon nitride nanotubes adsorbed with oxygen atoms ((8,0)_CNNT_O), it could be found that a peak near the Fermi energy level has disappeared in the graph of (8,0)_CNNT_O. It means that electrons present near the Fermi energy level have transferred to a bonding orbital inside an atom. This result substantially corresponds to that shown in FIG. 5.

Figure 6:
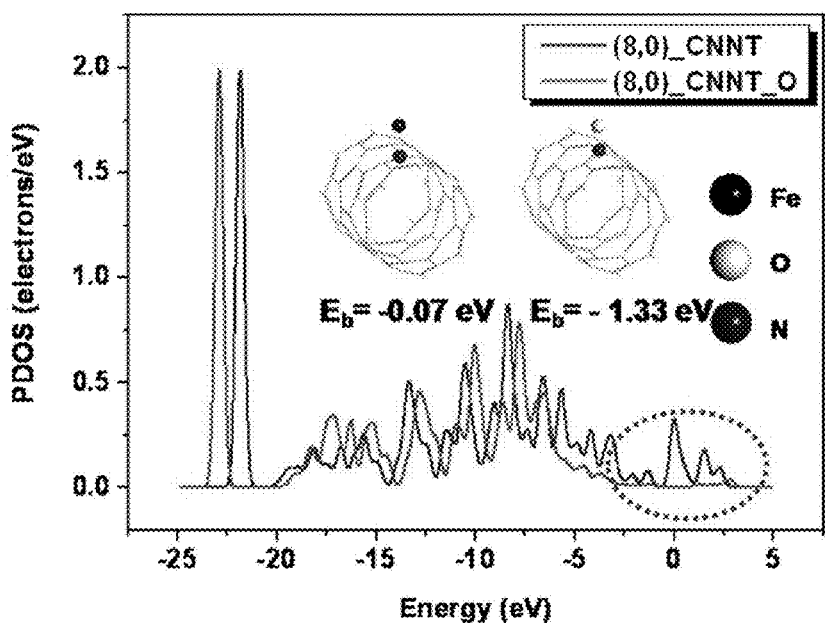
FIG. 6 is a graph showing results of PDOS analysis and binding energy in relation to nitrogen substituted (8,0) chiral carbon nitride nanotubes.

As a result of analyzing Eb indicated in FIG. 6, it can be seen that Fe adsorbed (8,0)_CNNT has Eb of −0.07 eV while (8,0)_CNNT_O has Eb of −1.33 eV. Such results demonstrate that O atoms are adsorbed during an initial nucleation rather than Fe atoms, with respect to a reaction between carbon nitride nanotubes and Fe acetylacetonate. This result is substantially the same as described in Experimental Example 2.

Experimental Example 4

Figure 7:
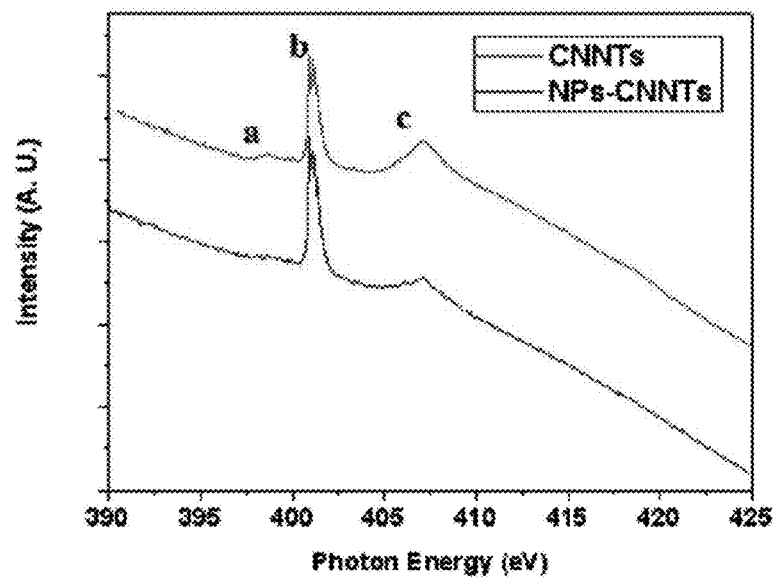
FIG. 7 is a graph showing results of near-edge X-ray absorption fine structure spectroscopy (NEXAFS) analysis for nitrogen contained in the hybrid comprising magnetite nanoparticles and carbon nitride nanotubes prepared in Preparative Example 1 of the present invention.

NEXAFS Analysis of Hybrid Comprising Magnetite Nanoparticles and Carbon Nitride Nanotubes For the hybrid comprising magnetite nanoparticles and carbon nitride nanotubes prepared in Preparative Example 1, a near-edge X-ray absorption fine structure spectroscopy (NEXAFS) analysis for nitrogen was performed and its result is shown in FIG. 7.

Comparing a graph for carbon nitride nanotubes (CNNTs) and a hybrid comprising magnetite nanoparticles and carbon nitride nanotubes (NPs-CNNTs), both of graphs show peaks at 398 eV (a-peak), 401 eV (b-peak) and 407 eV (c-peak). The a-peak is an absorption peak of nitrogen toward $\pi^*$ orbital, the c-peak is an absorption peak of nitrogen toward $\sigma^*$ orbital, and the b-peak is an absorption peak of nitrogen in a molecular state.

From both graphs in FIG. 7, it can be seen that the a-peak and the c-peak in the NPs-CNNTs graph were considerably decreased, compared to the a-peak and the c-peak in the CNNTs graph. On the other hand, the b-peak was substantially not altered. Such results demonstrate that graphite-like and/or pyridine-like nitrogen distributed on the surface of the carbon nitride nanotubes only had influence on adsorption of magnetite nanoparticles, which substantially correspond to those shown in FIGS. 5 and 6.

Experimental Example 5

Figure 8:
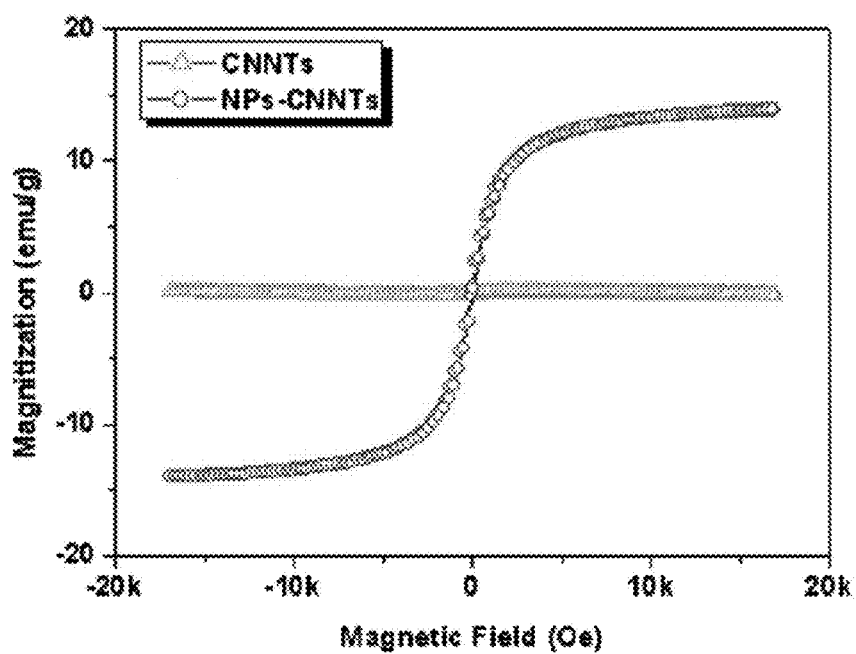
FIG. 8 is a graph showing results of vibrating sample magnetometer (VSM) analysis in relation to the hybrid comprising magnetite nanoparticles and carbon nitride nanotubes prepared in Preparative Example 1 of the present invention.

Superparamagnetic Properties of Hybrid Comprising Magnetite Nanoparticles and Carbon Nitride Nanotubes In order to investigate superparamagnetic properties of the hybrid comprising magnetite nanoparticles and carbon nitride nanotubes prepared in Preparative Example 1, a vibrating sample magnetometer (VSM) analysis was performed and its result is shown in FIG. 8.

In the CNNTs graph, magnetization was substantially not exhibited. On the other hand, superparamagnetic properties of NPs-CNNTs were obviously indicated in the NPs-CNNTs graph and magnetization thereof was 13.9 emu/g at 17K Oe.

Experimental Example 6

Dispersion of Hybrid Comprising Magnetite Nanoparticles and Carbon Nitride Nanotubes in Water and Activity of the Hybrid to External Magnetic Field For the hybrid comprising magnetite nanoparticles and carbon nitride nanotubes prepared in Preparative Example 1, dispersion of the hybrid in water and activity of the hybrid to external magnetic field were investigated.

Figure 9A:

The hybrid comprising magnetite nanoparticles and carbon nitride nanotubes was dispersed in water, followed by sonication. The sonication result is shown in FIG. 9A, revealing that the hybrid was sufficiently dispersed in water. This fact is because the terminal of a magnetite nanoparticle comprises a hydroxyl group.

Figure 9B:
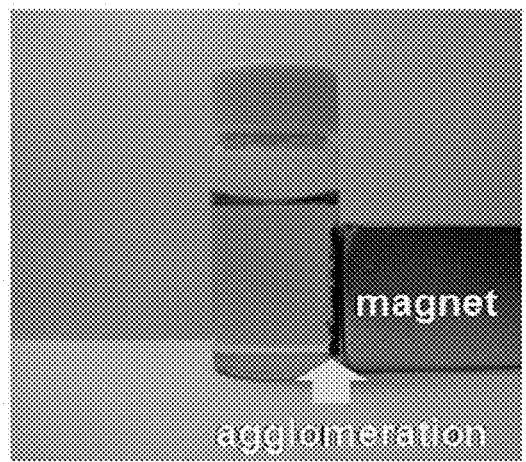
FIG. 9B is a photograph showing activity of a hybrid to an external magnetic field, the hybrid comprising magnetite nanoparticles and carbon nitride nanotubes being prepared in Preparative Example 1 of the present invention.

FIG. 9B is a photograph showing the hybrid dispersion after approaching a magnet to an external side of the hybrid. As shown in FIG. 9B, it was found that the hybrid comprising magnetite nanoparticles and carbon nitride nanotubes instantly reacts to a magnetic field (1T) even with a weak magnetic power such as a magnet, leading to agglomeration thereof.

Experimental Example 7

Figure 10:
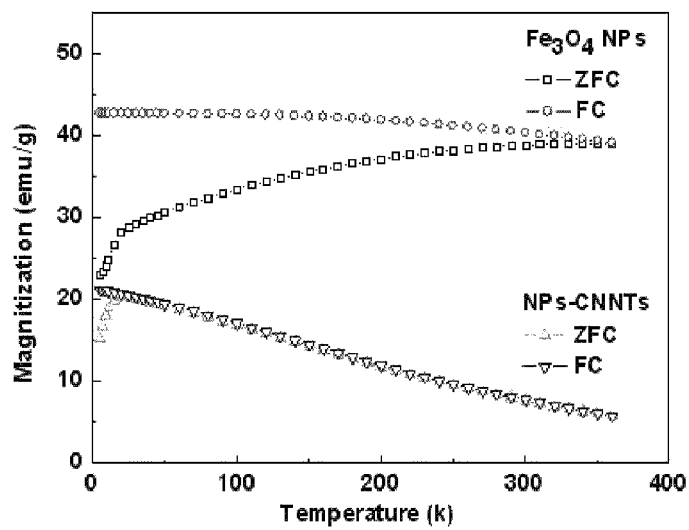
FIG. 10 is a graph showing results of superconducting quantum interference device (SQUID) analysis in relation to both of conventional magnetite nanoparticles and the hybrid comprising magnetite nanoparticles and carbon nitride nanotubes prepared in Preparative Example 1 of the present invention.

SQUID Analysis of Hybrid Comprising Magnetite Nanoparticles and Carbon Nitride Nanotubes In order to determine whether the hybrid comprising magnetite nanoparticles and carbon nitride nanotubes may have superparamagnetic properties, a superconducting quantum interference device (SQUID) analysis was performed and its result is shown in FIG. 10.

In the graph for conventional $Fe_3O_4$ NPs, a blocking temperature which a zero-field-cooling (ZFC) temperature and a field-cooling (FC) temperature contact was 360 K. In contrast, the graph for NPs-CNNTs of the present invention revealed that the blocking temperature was 20K. Comparing both the foregoing results, it can be understood that the inventive hybrid may have superparamagnetic properties maintained at room temperature without a coercive field.

Experimental Example 8

EDS Mapping of Silica-Coated Hybrid Comprising Magnetite Nanoparticles and Carbon Nitride Nanotubes In order to analyze a configuration and constitutional elements of the silica-coated hybrid comprising magnetite nanoparticles and carbon nitride nanotubes prepared in Preparative Example 2, an energy dispersive X-ray spectroscopy mapping (EDS) analysis was performed.

Figure 11:
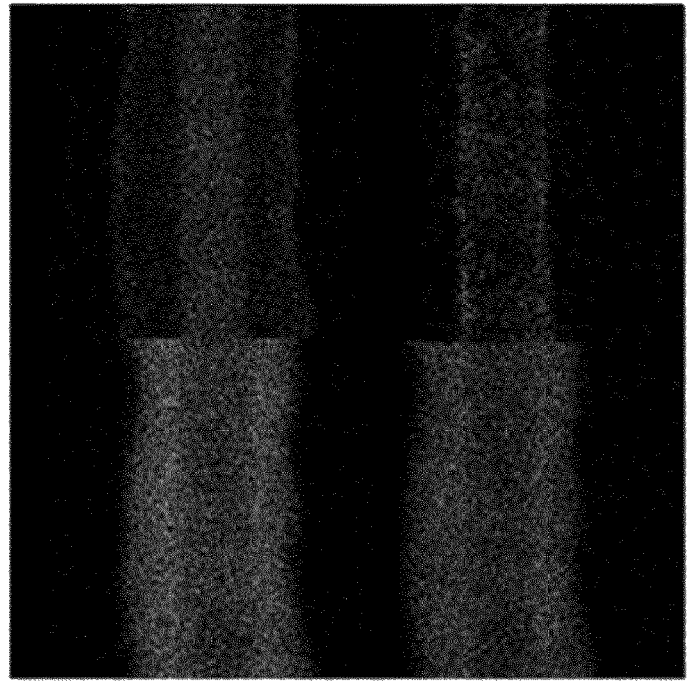
FIG. 11 is a graph showing results of energy dispersive X-ray spectroscopy (EDS) mapping analysis in relation to the hybrid comprising the silica-coated hybrid comprising magnetite nanoparticles and carbon nitride nanotubes prepared in Preparative Example 2 of the present invention.

Analyzed results are shown in FIG. 11 wherein C—K, Fe—K, O—K and Si—K are sequentially arranged in a clockwise direction beginning from the left upper side. As revealed by the EDS analysis in FIG. 11, C—K represents carbon nitride nanotubes at the innermost side, Fe—K represents magnetite nanoparticles evenly distributed on the surface of the carbon nitride nanotubes (that is, a host) and, in addition, Si—K and O—K represent both the surface of the magnetite nanoparticles coated with silica. From these results, a hierarchical configuration of the silica-coated hybrid prepared according to the present invention may be identified.

Experimental Example 9

Figure 12A:
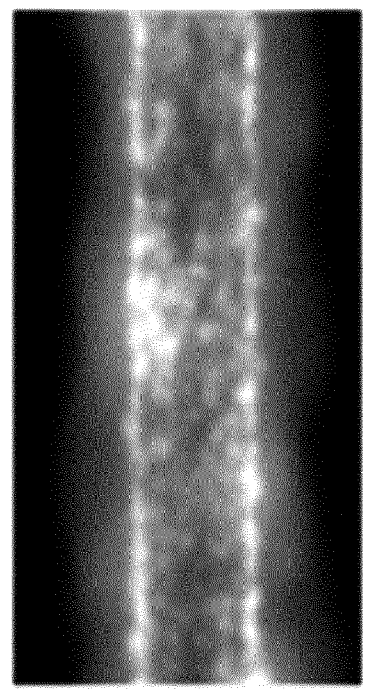

Superparamagnetic Properties of Silica-Coated Hybrid Comprising Magnetite Nanoparticles and Carbon Nitride Nanotubes In order to investigate a configuration of the silica-coated hybrid comprising magnetite nanoparticles and carbon nitride nanotubes prepared in Preparative Example 2, a STEM photograph of the hybrid was taken and shown in FIG. 12A. FIG. 12A revealed silica formed around the hybrid comprising magnetite nanoparticles and carbon nitride nanotubes.

Figure 12B:
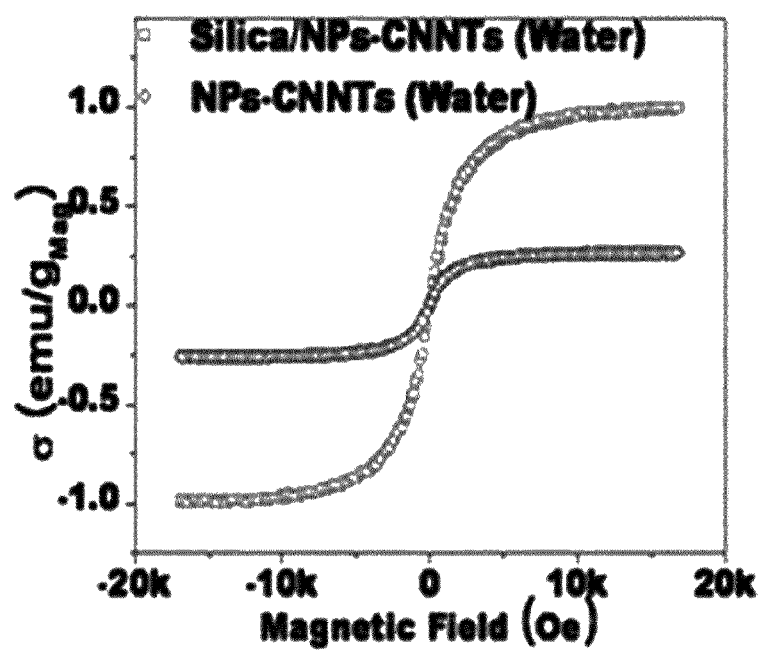
FIG. 12B is VSM analysis results of the same silica-coated hybrid, the hybrid comprising magnetite nanoparticles and carbon nitride nanotubes being prepared in Preparative Example 2 of the present invention.

For examination of superparamagnetic properties, the silica-coated hybrid was dispersed in water, followed by VSM analysis. The analyzed results are shown in FIG. 12B. A difference in magnetization of the NPs-CNNTs in water was about 73.5% while the silica-coated hybrid, that is, Silica/NPs-CNNTs exhibited a difference in magnetization of only about 0.4%. These results demonstrate that the Silica/NPs-CNNTs has higher chemical stability than the NPs-CNNTs.

The graph for typical CNNTs substantially showed no magnetization, while the graph for the inventive NPs-CNNTs obviously represented superparamagnetic properties of the hybrid and a magnetization of 13.9 emu/g at 17K Oe.

As described above, the hybrid comprising magnetite nanoparticles and carbon nitride nanotubes of the present invention may have not only original properties of the nanoparticles but also superparamagnetic properties, since nitrogen atoms substituted at the surface of the carbon nitride nanotubes act as nucleation sites enabling adsorption of magnetite nanoparticles with a constant size. In addition, with a silica coating, the hybrid may have improved chemical stability. Based on the foregoing advantages, the hybrid comprising magnetite nanoparticles and carbon nitride nanotubes of the present invention may be usefully employed in a variety of applications including medical materials, other applied composite materials, and so forth.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:
1. A method for preparation of a hybrid comprising magnetite nanoparticles and carbon nitride nanotubes, comprising:
 preparing carbon nitride nanotubes by plasma chemical vapor deposition (CVD);
 dissolving the prepared carbon nitride nanotubes in triethyleneglycol to form solution and adding Fe (acetylacetonate)$_3$ to the solution so as to obtain a mixture; and heating and cooling the mixture to form the hybrid comprising magnetite nanoparticles and carbon nitride nanotubes, in which the carbon nitride nanotubes are doped with magnetite nanoparticles.

2. The method according to claim 1, further comprising coating the hybrid with silica after formation of the hybrid comprising magnetite nanoparticles and carbon nitride nanotubes.

3. The method according to claim 1, wherein the CVD process is performed with a plasma power of 350 to 1,500 W at 500 to 850° C. under a pressure of 10 to 30 Torr.

4. The method according to claim 1, wherein the CVD process is performed using methane and nitrogen gases in a ratio by volume of 1:99 to 99:1.

5. The method according to claim 1, wherein the mixture contains carbon nitride nanotubes and Fe (acetylacetonate)$_3$ in a ratio by weight of 1~10:20~800.

6. The method according to claim 1, wherein the heating process is performed at 100 to 300° C.

7. The method according to claim 1, wherein the carbon nitride nanotubes have nitrogen in a graphite or pyridine structure substituted at the surface of the nanotubes.

8. The method according to claim 2, wherein the coating process is performed using a mixture of tetraethyl orthosilicate and $NH_4OH$.

* * * * *